Dec. 16, 1941.  P. E. SEARLS  2,266,570
CAN PUNCTURING AND DISPENSING DEVICE
Filed Aug. 30, 1939
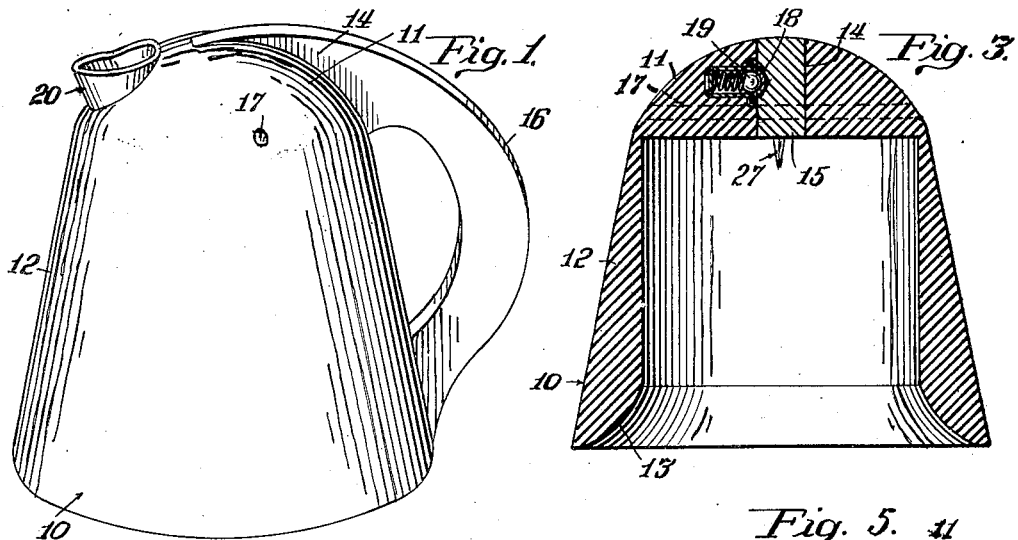
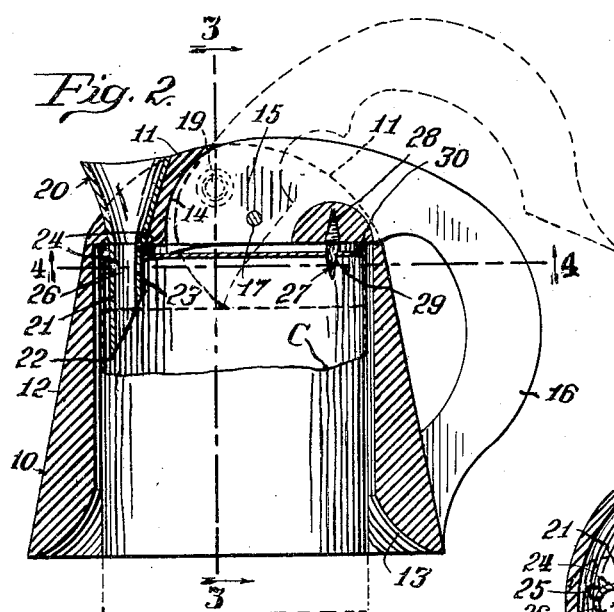
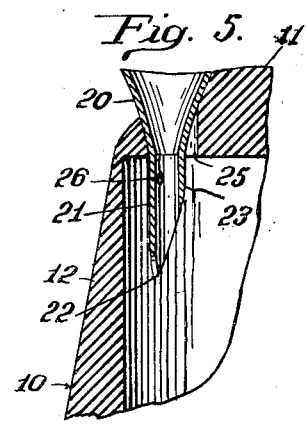
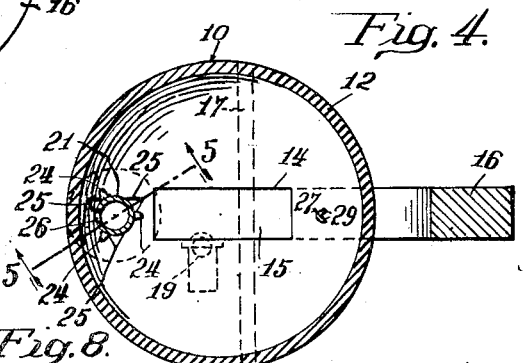
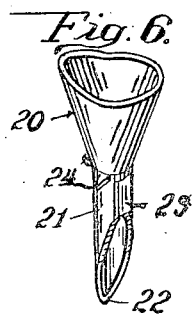
Inventor
Paul E. Searls,
By George Heidman
Attorney Patented Dec. 16, 1941

2,266,570

UNITED STATES PATENT OFFICE 2,266,570

CAN PUNCTURING AND DISPENSING DEVICE

Paul E. Searls, Chicago, Ill.

Application August 30, 1939, Serial No. 292,658

5 Claims. (Cl. 65—61)

My invention relates to a device, more especially intended for domestic use, which is adapted to be used with liquid containing cans, such as condensed milk and the like. More specifically stated, the invention contemplates an open bottom shell, of dimensions commensurate with the size of can generally employed for such commodities, which will completely enclose the top and sides of the can and firmly hold the latter in place during use; the integral top of the shell being provided with a can puncturing spout and with an air hole producing element which function when the shell is properly applied over one end of the commodity holding can.

The invention has for its object the provision of a device of a decorative and attractive form for table use, whereby the punctured can will be securely held within the device and the latter employed on the table of the user for dispensing or pouring the contents of the can in desired quantities.

Another object of the invention is the provision of a device which, by reason of the pouring spout construction, permits a complete draining or use of the can contents without permitting improper escape or leakage and without employing undesirable and unsanitary washers or the like; the pouring spout being removably locked in place and readily removable for cleaning purposes; the spout having a continuous channel therethrough which enables it to be easily cleaned.

The invention also contemplates a more or less streamlined hand-grasping portion or handle whereby the device with the enclosed can may be tilted for pouring and which also constitutes means for ejecting the empty can through the bottom of the device, such ejection being accomplished with the use of comparatively little force.

The foregoing enumerated objects and advantages of the invention as well as other advantages inherent in the invention will all be readily comprehended from the detailed description of the accompanying drawing wherein:

Figure 1 is a perspective view of my improved device.

Figure 2 is a vertical sectional view of the device illustrating, in full lines, its application to a can, the upper side wall whereof is broken away to show the can puncturing elements; the can ejecting position of the handle and the partly ejected can being shown in dotted lines.

Figure 3 is a vertical sectional view, taken substantially at right angles to Figure 2 on the line 3—3 of said figure.

Figure 4 is a cross sectional view taken substantially on the line 4—4 of Figure 2 looking in the direction of the arrows.

Figure 5 is a detail sectional view taken on the line 5—5 of Figure 4.

Figure 6 is a perspective view of the can puncturing and pouring spout.

Figure 7 is a vertical sectional view of the air vent producing element.

Figure 8 is a cross sectional view taken on the line 8—8 of Figure 7.

The specific embodiment of the invention as disclosed in the drawing comprises a main body or shell 10 preferably of a single piece moulded or otherwise formed to provide an arcuate top 11 which curves downwardly into the substantially annular side wall 12 whose outer surface is shown sloping outwardly toward the bottom for decorative purposes, while the interior surface of the side wall is uniform and in the nature of a cylinder as shown in Figures 2 and 3. The device is open at its bottom and in order to facilitate its application to a can the lower marginal portion or perimeter of the side wall is preferably flared outwardly as shown at 13 which causes the can to be properly centered, or vice versa, when the device is forced downwardly over one end of the can of condensed milk, or other fluid commodity.

The top portion 11, for a predetermined distance, is provided with a transverse slot 14, one end whereof extends downwardly to the interior of the device for the purpose of receiving the the head 15 of the hand grasping element or handle 16 which is pivotally mounted in the top 11 by means of the transversely disposed pin 17. The tail or lower free end of the handle is adapted to normally rest against the side wall of the device, while the head portion or upper end of the handle is pivoted off center to permit the tip of the portion 15 of the handle to swing downwardly and into contact with the upper end of the enclosed can, shown at C, when sufficient upward pulling force is exerted on the handle for the purpose of ejecting the encased can through the open bottom of the device.

In order to hold the handle 16 in untilted position during normal use of the device, I show the side of the head of handle 16 provided with a small socket, as at 18, see Figure 3, to receive the spring pressed ball 19 mounted in a socket formed in the top 11 of the device, as shown in Figures 2 and 3; the pressure of the spring controlled ball 19 being sufficient to hold the handle against upward movement when the device is ordinarily tilted for pouring purposes and at the same time allow the handle to be tilted into the can ejecting position shown in dotted lines in Figure 2 when the body of the device is held by the user and sufficient upward force is exerted on the free end of the handle.

The top 11, adjacent one side of the device, is provided with a vertically disposed hole slightly flared at its upper end to receive the flared upper end of the spout member 20 shown in detail in Figure 6; the flared upper end preferably tapering to one side to enable proper pouring. The lower tubular portion 21 tapers off at its lower end into a can puncturing tip 22; and the rear side (relative to the pouring side of the device) of this tubular portion 21 is preferably flattened and minutely dished transversely as shown at 23 in order to induce the displaced or cut tin of the can to roll upon itself against the slightly dished portion 23; the spring action of the rolled tin forcing the spout against the opposite side of the opening and thereby effecting a firm non-slipping and liquid-tight relation with the punctured wall of the can and thus obviate the necessity of employing an unsanitary washer as would be the case if the lower portion was entirely cylindrical. The spout member 20 on its tubular portion 21 is provided with a plurality of circumferentially spaced small projections 24, see Figures 4 and 6, which are adapted to pass through similarly shaped slots 25 formed in the wall of the device adjacent the lower end of the spout receiving hole; the lower ends of the slots 25 being slightly offset or undercut to receive the prongs or projections 24 after the spout has been completely inserted and given a partial turn, thus locking the spout in place against accidental removal. With my improved construction the spout, upon slight rotation out of its normal pouring position, may be readily removed for cleaning and thus enabling the device to be kept in sanitary condition. The forward side of the tubular portion 21 of the spout is also provided with a small opening 26 which permits the entire contents of the can to be poured therefrom, as the opening 26 will be disposed immediately beneath the end wall of the can and at the lowest point when the can is tilted upwardly.

The top 11 of the device, preferably at a point substantially diametrically opposite the spout 20, is provided on its lower surface with a vent opening producing member 27 having a tapered screw-threaded upper end 28 whereby the member is secured in the top 11 while the lower end is channeled and tapers to a can puncturing point, as shown at 29; this lower end 29 being shown V-shape in cross-section, see Figure 8.

Although the device is made to approximate the configuration and cylindrical dimensions of the can, sufficient air will enter between the side of the can and the inner wall of the device and enter the slight space above the can end which is held in slight spaced relation with the top 11 by the usual beaded or curled end of the can, as shown at 30 in Figure 2. By reason of this condition, the upper end of the channel in the puncturing end 29 of member 27 will be exposed to the air space above the can and thus admit air into the can to facilitate proper pouring.

The device—which, for attractive purposes, is of inverted cup shape or of kettle-like formation—is of dimensions in keeping with the size of can of condensed milk generally purchased by the user and placed over one end of the can and pressed down, causing the pointed end of the pouring spout to puncture the can; the device being forced downwardly until the rim at the upper end of the can practically contacts the top wall of the device, at which time the vent forming member will also have punctured the can, permitting air inflow and free outflow of the milk through the pouring spout. It has been found in practice that the formation of a flat side on the spout effects a snug non-leak relation with the can and at the same time firmly holds the can in invisible position within the device where it remains until all the milk, or other fluid content, has been completely used or poured from the can. The pouring or upper end of the spout may be closed between periods of use by a suitable stopper; and the device with the encased can may be carried by grasping the handle which is frictionally held in normal position by the ball-and-socket latching mechanism. After the contents have been completely drained or poured from the can (a condition made possible by the location of the drain opening in the side of the spout above its puncturing point) the latter can be easily ejected or forced through the open bottom of the device by lifting the free end of the handle which forces the latch element to move out of latching position and causes the tip of the handle-head to move downwardly into contact with the end of the can.

It will be understood that the device may be made in various sizes, commensurate with the more or less standard sized cans employed, and moulded or made of some suitable material, as for example Bakelite; and while the exemplification shown in the drawing is believed to be the best embodiment of the invention, certain modifications may be made without, however, departing from the spirit of the invention as expressed in the appended claims.

What I claim is:

1. A device of the character described comprising a single piece open-bottom container with an integral top and adapted to endwisely receive a can, the container-top being provided with an opening adjacent one side wall of the container and with a slot extending toward opposite side wall of the container; a can puncturing and pouring spout disposed through said opening; and a handle normally depending at one side of the container and pivotally mounted in said slot at a distance removed from the upper end of the handle so as to permit the free end of the handle to swing upwardly while the portion of handle beyond its pivot swings downwardly through the slot to the container interior and constitutes a can ejector.

2. A device of the character described comprising a container of inverted cup-shape adapted to fit over an end of a can and provided with an opening in its top and with a slot disposed transversely of the top; a can puncturing and pouring spout removably secured in said opening and formed to effect locking engagement with the container; and a vertically disposed handle normally depending at the side of the container and whose upper end is pivotally secured in the slot in the container-top and is provided with a projection adapted to swing downwardly through said slot into pressing contact with the top of the can when the free end of said handle is swung upwardly.

3. A device of the character described comprising an inverted cup-shape shell adapted to endwisely receive a sealed can, the top of the shell adjacent one side being provided with an opening having slots in the side walls thereof adjacent the lower end of the opening and a transversely disposed slot intermediate of said opening and the opposite side of the shell; a pouring spout removably seated in said opening and provided with a flared upper orifice and a can puncturing lower end, the sides of said spout having projections adapted to pass through the first mentioned slots and effect locking engagement with the inner face of the shell-top, the spout having a drain opening intermediate its ends; a can puncturing element secured on the inner surface of the shell-top; a handle pendently disposed at one side of the shell with its upper head end eccentrically pivoted in said transversely disposed slot in the shell-top so as to be swung vertically and thereby cause the head portion of the handle to move downwardly through said slot into contact with the upper end of the enclosed can; and means arranged in the top of the shell adjacent said vertically disposed slot for yieldingly holding said handle in normal position.

4. A device of the character described comprising an inverted cup-shape shell adapted to endwisely receive a sealed can, the shell-top adjacent one side having an opening therethrough and having a vertical slot intermediate of the shell-sides; a pouring spout seated in said opening and provided with a can puncturing lower end, the shell-top and the sides of the spout having inter-engaging surfaces for removably securing the spout in said opening, said spout adjacent its lower end and on one side having a transversely dished surface; a handle disposed vertically at one side of the shell and having a head portion eccentrically pivoted in said vertical slot whereby the eccentric portion of the head will move downwardly through said slot into engagement with the upper end of the can when said handle is raised; and an air vent providing element secured within the shell adapted to puncture the can when the shell is forced downwardly over the end of the can.

5. A device of the character described adapted to endwisely receive a sealed can comprising a dome-shaped container having integral top and side walls and open at the bottom, the top being provided with an opening and with a transversely disposed slot and the inner surface of the top adjacent the side wall removed from said opening being provided with a can puncturing element, a combined can puncturing and pouring spout element arranged in said opening and provided with a can draining opening in its side above the lower puncturing end; and a handle pivotally secured at its upper end in said slot so as to swing upwardly, said handle being normally disposed at the container side, the pivoted end of the handle being enlarged radially so as to move into the container interior and into engagement with the top of the can therein when said handle is swung upwardly.

PAUL E. SEARLS.